Nov. 18, 1924. 1,516,347
A. PATAKY
COUPLING PIN
Filed Aug. 30 1923
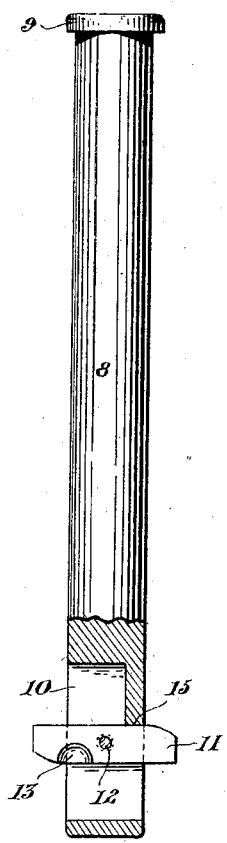
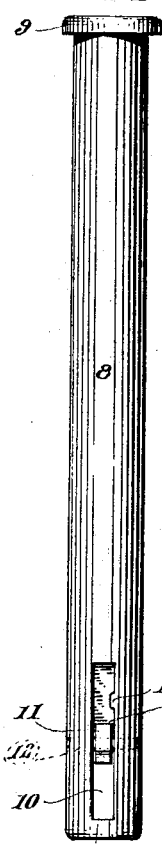
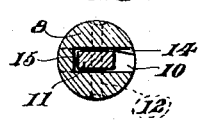
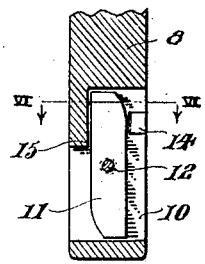
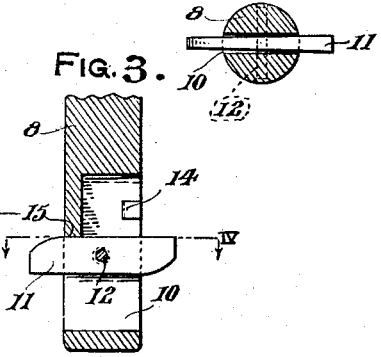
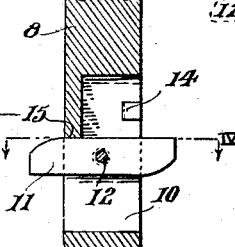
Inventor
A. Pataky
By F. K. Bryant
Attorney Patented Nov. 18, 1924.

1,516,347

UNITED STATES PATENT OFFICE.

ANTON PATAKY, OF CONNEAUT, OHIO.

COUPLING PIN.

Application filed August 30, 1923. Serial No. 660,164.

*To all whom it may concern:*

Be it known that I, ANTON PATAKY, a citizen of the United States of America, residing at Conneaut, in the county of Ashtabula and State of Ohio, have invented certain new and useful Improvements in Coupling Pins, of which the following is a specification.

This invention relates to improvements in coupling pins.

In previous types of coupling pins it was always necessary after the pin had been inserted, to secure the same by placing a cotter pin in one end thereof. It is well known that these pins often work loose or wear off and in this way the coupling pins become loosened and thereby causing a great number of accidents which might otherwise be overcome.

It is, therefore, a prime object of this invention to provide a coupling pin wherein novel means are employed to secure the same after having been inserted for use.

Another important object of this invention is to provide a device of the above mentioned character, which is compact in structure, of few parts, and one that may be placed upon the market at a reasonable cost.

Other objects and advantages will readily become apparent during the course of the following description, in which, Figure 1 is an elevational view of the coupling pin partly in section showing a side view of the pin securing means in an operative position, Figure 2 is an elevational view of the coupling pin showing an end view of the pin securing means in an operative position, Figure 3 is a fragmentary elevational view partly in cross section of the pin securing means showing the reverse side of Fig. 1, Figure 4 is a top plan view partly in section taken on the line IV—IV of Fig. 3, Figure 5 is a fragmentary elevational view partly in section showing a side view of the pin securing means in an inoperative position, and Figure 6 is a cross sectional view taken on the line VI—VI of Fig. 5.

In the drawings, wherein for the purpose of illustration is shown a preferred embodiment of my invention, the numeral 8 designates my improved coupling pin, which may be formed from rolled steel or the like, and is provided with the usual head 9.

Extending transversely through the lower end of said coupling pin 8 is a substantially L-shaped slot 10, which is adapted to receive a locking pin 11, the same being pivotally mounted therein by means of a cross pin or rivet 12 as shown. The locking pin 11 has formed in one side thereof a depression 13, the purpose of which will more fully hereinafter be described.

Formed on one side of the L-shaped slot 10, is a raised portion or lug 14. The formation of the L-shaped slot 10 formed in the coupling pin 8, also provides a shoulder or abutment 15 against which one end of the locking pin 11 abuts when in operative position, thereby holding the same in a true horizontal plane with respect to the coupling pin 8.

In operation, the pin is swung within the housing formed by the L-shaped slot 10. The lug 14 binds against the locking pin 11 until the depression 13 is reached when the binding action ceases, thus holding the locking pin 11 within the housing while the pin is being inserted in whatever it is desired to lock. After the pin has been inserted, the depression 13 will allow the locking pin 11 to be swung out far enough to be grasped by the fingers and pulled past the locking lug 14 and placed in operative position. Thus the lug 14 serves the double purpose of locking the pin 11 within the housing, and preventing the same from swinging into the housing, unless forced, when placed in an operative position.

While I have shown and described the preferred form of my invention, it is to be understood that various changes in the shape, size, and arrangement of parts may be resorted to without departing from the spirit of the invention or the scope of the subjoined claim.

Having thus described my invention, I claim:—

In a coupling pin having a housing formed in one end thereof, a locking pin pivotally mounted in said housing and adapted to be positioned therewithin when in an inoperative position and to extend at right angles to the axis of said coupling pin when in an operative position, a wedgeshaped lug positioned within said housing for preventing said locking pin from being accidentally pivotally moved into its operative position after having been pivotally moved into its inoperative position, said locking pin having a depression formed in one side thereof adapted to register with said lug for permitting said locking pin to be free to move partially out of its inoperative position within said housing whereby it may be grasped and forced to pivot into its operative position.

In testimony whereof I affix my signature.

ANTON PATAKY.